US008399560B2

(12) United States Patent
Schultes et al.

(10) Patent No.: US 8,399,560 B2
(45) Date of Patent: *Mar. 19, 2013

(54) USE OF POLYALKYL(METH)ACRYLATE BEAD POLYMERS AND MOULDING MATERIAL FOR PRODUCING EXTRUDED MOULDED PARTS WITH A MATT SURFACE

(75) Inventors: Klaus Schultes, Wiesbaden (DE); Peter Battenhausen, Brachttal-Udenhain (DE); Ursula Golchert, Dieburg (DE); Stefan Nau, Buettelborn (DE); Werner Hoess, Shanghai (CN)

(73) Assignee: Evonik Roehm GmbH, Darmstadt (DE)

( * ) Notice: Subject to any disclaimer, the term of this patent is extended or adjusted under 35 U.S.C. 154(b) by 1120 days.

This patent is subject to a terminal disclaimer.

(21) Appl. No.: 11/661,651

(22) PCT Filed: Aug. 30, 2005

(86) PCT No.: PCT/EP2005/009310
§ 371 (c)(1),
(2), (4) Date: Mar. 1, 2007

(87) PCT Pub. No.: WO2006/029704
PCT Pub. Date: Mar. 23, 2006

(65) Prior Publication Data
US 2007/0276093 A1    Nov. 29, 2007

(30) Foreign Application Priority Data
Sep. 16, 2004   (DE) .................. 10 2004 045 296

(51) Int. Cl.
*C08F 2/38* (2006.01)
*C08F 20/10* (2006.01)
*C08J 5/10* (2006.01)
*C08L 33/12* (2006.01)
*C08L 51/06* (2006.01)

(52) U.S. Cl. .................. 525/80; 525/85; 525/261
(58) Field of Classification Search .............. 525/80, 525/85, 261
See application file for complete search history.

(56) References Cited

U.S. PATENT DOCUMENTS

| 4,833,221 A | 5/1989 | Albrecht |
| 5,110,877 A | 5/1992 | Hoess et al. |
| 5,155,172 A | 10/1992 | Siol et al. |
| 5,219,931 A | 6/1993 | Siol et al. |
| 5,270,397 A | 12/1993 | Rhein et al. |
| 5,280,073 A | 1/1994 | Siol et al. |
| 5,530,080 A | 6/1996 | Siol et al. |
| 5,548,033 A | 8/1996 | Vetter et al. |
| 5,612,417 A | 3/1997 | Rhein et al. |
| 5,652,316 A | 7/1997 | May et al. |
| 5,705,189 A | 1/1998 | Lehmann et al. |
| 5,726,245 A | 3/1998 | Numrich et al. |
| 6,040,387 A | 3/2000 | Albrecht et al. |
| 6,214,942 B1 | 4/2001 | Siol et al. |
| 6,287,470 B1 | 9/2001 | Vetter et al. |
| 6,355,712 B1 | 3/2002 | Schultes et al. |
| 6,576,255 B1 | 6/2003 | Petereit et al. |
| 6,613,871 B2 | 9/2003 | Hoess et al. |
| 6,765,046 B1 | 7/2004 | Numrich et al. |
| 6,803,416 B2 | 10/2004 | Schultes et al. |
| 6,809,163 B2 | 10/2004 | Schultes et al. |
| 6,890,993 B2 | 5/2005 | Schultes et al. |
| 6,998,140 B2 | 2/2006 | Meier et al. |
| 7,046,952 B2 | 5/2006 | Kurotori et al. |
| 7,179,852 B2 | 2/2007 | Schultes et al. |
| 2002/0160042 A1 | 10/2002 | Petereit et al. |
| 2004/0104501 A1 | 6/2004 | Petereit et al. |
| 2004/0116567 A1 | 6/2004 | Schmitt et al. |
| 2005/0065224 A1 | 3/2005 | Menzler et al. |
| 2005/0080188 A1 | 4/2005 | Schultes et al. |
| 2005/0152977 A1 | 7/2005 | Petereit et al. |
| 2005/0267250 A1 | 12/2005 | Theil et al. |
| 2006/0052515 A1 | 3/2006 | Schultes et al. |
| 2006/0121248 A1 | 6/2006 | Lorenz et al. |
| 2006/0147714 A1 | 7/2006 | Schultes et al. |
| 2006/0175735 A1 | 8/2006 | Hoess et al. |
| 2006/0281887 A1 | 12/2006 | Petereit et al. |

(Continued)

FOREIGN PATENT DOCUMENTS

CN    1267678 A      9/2000
DE    10349144   *   5/2009

(Continued)

OTHER PUBLICATIONS

Deckers. electroniic translation of DE4237209, May 1994.*

(Continued)

*Primary Examiner* — Jeffrey Mullis
(74) *Attorney, Agent, or Firm* — Oblon, Spivak, McClelland, Maier & Neustadt, L.L.P.

(57) ABSTRACT

The invention relates to the use of polyalkyl(meth)acrylate bead polymers with an average particle size $V_{50}$ that ranges between 30 and 70 μm for improving the stress cracking resistance of moulding materials containing polyalkyl(meth)acrylate. The invention also relates to moulding materials comprising: a) at least 50 wt. % of an impact resistance modifying agent, which contains at least one polyalkyl(meth)acrylate phase; b) at least 8 wt. % of a polyalkyl(meth)acrylate bead polymer with an average particle size $V_{50}$ that ranges between 30 and 70 μm; and c) between 0 and 42 wt. % of a polyalkyl(meth)acrylate with a molecular weight ranging between 20,000 and 350,000 g/mol, whereby the wt. % of the components a) to c) amounts to 100 wt. %, and to moulded bodies that can be obtained from said materials.

12 Claims, No Drawings

U.S. PATENT DOCUMENTS

| | | | |
|---|---|---|---|
| 2007/0055017 A1* | 3/2007 | Schultes et al. | 525/101 |
| 2007/0066708 A1 | 3/2007 | Goldacker et al. | |
| 2007/0112135 A1 | 5/2007 | Wicker et al. | |
| 2007/0122624 A1 | 5/2007 | Schultes et al. | |
| 2007/0123610 A1 | 5/2007 | Schultes et al. | |
| 2007/0197703 A1 | 8/2007 | Neuhauser et al. | |
| 2007/0222117 A1 | 9/2007 | Hoess et al. | |
| 2007/0276093 A1 | 11/2007 | Schultes et al. | |
| 2008/0242782 A1 | 10/2008 | Hager et al. | |
| 2008/0248298 A1 | 10/2008 | Numrich et al. | |
| 2008/0281023 A1 | 11/2008 | Numrich et al. | |
| 2010/0098907 A1 | 4/2010 | Schultes et al. | |
| 2010/0098908 A1 | 4/2010 | Schultes et al. | |
| 2010/0148401 A1 | 6/2010 | Schultes et al. | |
| 2010/0167045 A1 | 7/2010 | Schultes et al. | |
| 2010/0174022 A1 | 7/2010 | Schultes et al. | |
| 2010/0189983 A1 | 7/2010 | Numrich et al. | |
| 2011/0009539 A1 | 1/2011 | Goldacker et al. | |
| 2011/0269883 A1 | 11/2011 | Battenhausen et al. | |
| 2011/0290300 A1 | 12/2011 | Battenhausen et al. | |

FOREIGN PATENT DOCUMENTS

| | | |
|---|---|---|
| EP | 0 596 290 | 5/1994 |
| EP | 1 022 115 | 7/2000 |
| EP | 1 219 641 | 7/2002 |
| JP | 8-60000 | 3/1996 |
| JP | 2005-276566 | 10/2005 |
| JP | 2006-199914 | 8/2006 |
| WO | 01 12719 | 2/2001 |

OTHER PUBLICATIONS

U.S. Appl. No. 11/748,874, filed May 15, 2007, Schultes, et al.
U.S. Appl. No. 11/720,653, filed Jun. 1, 2007, Schultes, et al.
U.S. Appl. No. 11/813,946, filed Jul. 13, 2007, Schultes, et al.
U.S. Appl. No. 11/817,407, filed Aug. 30, 2007, Hoess, et al.
U.S. Appl. No. 11/913,325, filed Nov. 1, 2007, Schwarz-Barac, et al.
U.S. Appl. No. 60/831,222, filed Jul. 17, 2006, Hager, et al.
U.S. Appl. No. 11/970,190, filed Jan. 7, 2008, Schultes, et al.
U.S. Appl. No. 12/094,277, filed May 20, 2008, Schultes, et al.
U.S. Appl. No. 12/436,809, filed May 7, 2009, Schultes, et al.
U.S. Appl. No. 12/922,627, filed Sep. 14, 2010, Khrenov, et al.
U.S. Appl. No. 13/241,776, filed Sep. 23, 2011, Hoess, et al.
U.S. Appl. No. 12/738,033, filed Apr. 14, 2010, Schultes, et al.
U.S. Appl. No. 12/682,405, filed Apr. 9, 2010, Schmidt, et al.
U.S. Appl. No. 13/058,364, filed Feb. 10, 2011, Golchert, et al.
Japanese Office Action issued Oct. 3, 2011, in Patent Application No. 2010-537341 (German translation only).
Search Report issued May 4, 2012 in Taiwanese Patent Application No. 094131144 (English translation only).
U.S. Appl. No. 12/300,408, filed Nov. 11, 2008, Hoess, et al.

* cited by examiner

USE OF POLYALKYL(METH)ACRYLATE BEAD POLYMERS AND MOULDING MATERIAL FOR PRODUCING EXTRUDED MOULDED PARTS WITH A MATT SURFACE

The present invention relates to the use of polyalkyl(meth) acrylate bead polymers. The present invention further relates to molding compositions for production of extruded moldings with a matt surface.

Molding compositions based on polymethyl methacrylate are used for various applications. For this purpose, the compositions are extruded to give moldings or are injection-molded. These moldings generally feature the typical properties of polymethyl methacrylate, e.g. high scratch resistance, weathering resistance, and heat resistance, and excellent mechanical properties.

For some applications, in particular in the furniture industry, a matt surface is desired because of pleasanter feel, the visual effect, and greater scratch resistance. This type of surface can be achieved via measures during the extrusion process. However, a disadvantage here is that forming gives a smooth surface, and matt effects are therefore preferably achieved via the incorporation of organic or inorganic particles. However, molding compositions modified therewith generally exhibit poor stress cracking resistance after extrusion. This is particularly apparent in direct comparison with extrudates in which no matting particles are present.

By way of example, EP-A-781808 describes improvement in stress cracking resistance via additives. That publication relates to molding compositions which have improved stress cracking resistance. However, those molding compositions encompass no matting agents. According to that publication, furthermore, the object is achieved by way of a molding composition which comprises from 1 to 50% by weight of particles whose size is from 50 to 500 nanometers. A disadvantage of this method of achieving the object is the additional costs arising via the use of these specific particles. Furthermore, these polymer particles have to be prepared via emulsion polymerization. Accordingly, these particles inevitably encompass a relatively high content of surfactants and emulsifiers, which can have a disadvantageous effect on the molding composition or on the moldings obtainable therefrom.

In the light of the prior art discussed and stated herein, it was therefore an object of the present invention to find molding compositions which can be molded via extrusion to give stress-cracking-resistant moldings with matt surfaces, which have an excellent property profile. The articles obtainable via the molding compositions should in particular have good capability for shaping, high weathering resistance, good mechanical properties, in particular good impact resistance, and high modulus of elasticity, and also high heat resistance.

The molding compositions, and also the moldings obtainable from the molding compositions, should moreover be capable of low-cost production. The moldings should moreover exhibit high scratch resistance, and in particular any scratches arising here should be difficult to discern visually.

The use described in the specification achieves these objects and also achieves other objects which, although not explicitly mentioned, can be self-evidently derived from the circumstances discussed herein or are an inevitable result thereof.

Advantageous embodiments of the inventive use are described in the specifictaion.

Embodiments of the present invention achieve the underlying object with respect to the molding compositions.

Other embodiments provide an excellent result in relation to the underlying problems concerning the moldings.

In one embodiment, the invention relates to the use of polyalkyl(meth)acrylate bead polymers with an average particle size $V_{50}$ that ranges between 30 and 70 μm for improving the stress cracking resistance of moulding materials containing polyalkyl(meth)acrylate. In another embodiment, the invention relates to moulding materials comprising: a) at least 50 wt. % of an impact resistance modifying agent, which contains at least one polyalkyl(meth)acrylate phase; b) at least 8 wt. % of a polyalkyl(meth)acrylate bead polymer with an average particle size $V_{50}$ that ranges between 30 and 70 μm; and c) between 0 and 42 wt. % of a polyalkyl(meth) acrylate with a molecular weight ranging between 20,000 and 350,000 g/mol, whereby the wt. % of the components a) to c) amounts to 100 wt. %, and to moulded bodies that can be obtained from said materials.

Surprisingly, use of polyalkyl(meth)acrylate bead polymers whose median particle size $V_{50}$ is in the range from 30 to 70 μm can improve the stress cracking resistance of polyalkyl (meth)acrylate-containing molding compositions which can be used for production of moldings with a matt surface.

The inventive measures moreover achieve the following advantages, inter alia:

The inventive use can provide molding compositions for production of moldings which exhibit high stress cracking resistance. The moldings obtainable from the molding compositions moreover have excellent mechanical properties, in particular high modulus of elasticity.

The molding compositions obtainable via the use can serve for production of moldings with high heat resistance, light resistance, and scratch resistance.

Scratches which have arisen on the surface are difficult to discern visually.

The present use can moreover give molding compositions which can be impact-modified with particular ease.

The inventive use can moreover provide low-cost improvement in the stress cracking resistance of polyalkyl(meth) acrylate molding compositions.

The polyalkyl(meth)acrylate bead polymers to be used for the purposes of the present invention are known per se. These are usually obtained via polymerization of formulations which encompass a high proportion of (meth)acrylates.

The formulation to be polymerized comprises at least 50% by weight of (meth)acrylate, based on the weight of the monomers. The proportion of the (meth)acrylates is preferably at least 60% by weight, and particularly preferably is at least 80% by weight, based on the weight of the monomers. The expression polymerizable formulation designates ethylenically unsaturated monomers which may be used individually or in the form of a mixture.

The expression (meth)acrylates encompasses methacrylates and acrylates, and also mixtures of the two. These monomers are well known.

Among these are, inter alia, (meth)acrylates which derive from saturated alcohols, e.g. methyl(meth)acrylate, ethyl (meth)acrylate, propyl(meth)acrylate, n-butyl(meth)acrylate, tert-butyl(meth)acrylate, pentyl(meth)acrylate and 2-ethylhexyl(meth)acrylate; (meth)acrylates which derive from unsaturated alcohols, e.g. oleyl(meth)acrylate, 2-propynyl(meth)acrylate, allyl(meth)acrylate, vinyl(meth)acrylate; aryl(meth)acrylates, such as benzyl(meth)acrylate or phenyl (meth)acrylate, where each aryl radical may be unsubstituted or have up to four substituents; cycloalkyl(meth)acrylates, such as 3-vinylcyclohexyl(meth)acrylate, bornyl(meth)acrylate; hydroxyalkyl(meth)acrylates, such as 3-hydroxypropyl (meth)acrylate, 3,4-dihydroxybutyl(meth)acrylate, 2-hydroxyethyl(meth)acrylate, 2-hydroxypropyl(meth)acrylate; glycol di(meth)acrylates, such as 1,4-butanediol(meth)acrylate, (meth)acrylates of ether alcohols, e.g. tetrahydrofurfuryl (meth)acrylate, vinyloxyethoxyethyl(meth)acrylate; amides and nitriles of (meth)acrylic acid, e.g. N-(3-dimethylaminopropyl)(meth)acrylamide, N-(diethylphosphono)(meth)acrylamide, 1-methacryloylamido-2-methyl-2-propanol; sulfur-containing methacrylates, such as ethylsulfinylethyl (meth)acrylate, 4-thiocyanatobutyl(meth)acrylate, ethylsulfonylethyl(meth)acrylate, thiocyanatomethyl(meth)acrylate, methylsulfinylmethyl(meth)acrylate, bis((meth)acryloyloxyethyl)sulfide; polyfunctional(meth)acrylates, such as butanediol dimethacrylate, glycerol tri(meth)acrylate, trimethylolpropane tri(meth)acrylate.

Alongside the (meth)acrylates described above, the formulations to be polymerized may also comprise other unsaturated monomers which are copolymerizable with the abovementioned (meth)acrylates. The amount generally used of these compounds is from 0 to 50% by weight, preferably from 0 to 40% by weight and particularly preferably from 0 to 20% by weight, based on the weight of the monomers, and the comonomers here may be used individually or in the form of a mixture.

Among these are, inter alia, 1-alkenes, such as 1-hexene, 1-heptene; branched alkenes, such as vinylcyclohexane, 3,3-dimethyl-1-propene, 3-methyl-1-diisobutylene, 4-methyl-1-pentene;

Vinyl esters, such as vinyl acetate; styrene, substituted styrenes having an alkyl substituent in the side chain, e.g. α-methylstyrene and α-ethylstyrene, substituted styrenes having an alkyl substituent on the ring, e.g. vinyltoluene and p-methylstyrene, halogenated styrenes, such as mono-chlorostyrenes, dichlorostyrenes, tribromostyrenes and tetrabromostyrenes; heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinyl-pyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinyl-pyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinyl-thiazoles and hydrogenated vinylthiazoles, vinyloxazoles and hydrogenated vinyloxazoles;

Vinyl ethers and isoprenyl ethers; maleic acid derivatives, such as maleic anhydride, methylmaleic anhydride, maleimide, methylmaleimide; and dienes, such as 1,2-divinylbenzene, 1,3-divinylbenzene, 1,4-divinylbenzene, 1,2-diisopropenylbenzene, 1,3-diisopropenylbenzene and 1,4-diisopropenylbenzene.

Preferred polyalkyl(meth)acrylate bead polymers can be obtained via polymerization of formulations which comprise
a) from 10 to 100% by weight, preferably from 30 to 99% by weight and particularly preferably from 50 to 98% by weight, of methyl methacrylate
b) from 0 to 30% by weight, preferably from 0.1 to 20% by weight and particularly preferably from 1 to 10% by weight, of crosslinking monomers and
c) from 0 to 90% by weight, preferably from 5 to 70% by weight and particularly preferably from 10 to 40% by weight, of monofunctional comonomers, where each percentage stated is based on the weight of the monomers.

Crosslinking monomers are known per se. These monomers encompass at least two groups capable of free-radical polymerization, capable of copolymerization with methyl methacrylate. Among these are the polyfunctional(meth) acrylates and dienes described above. The mono-functional comonomers encompass one group capable of free-radical polymerization and are copolymerizable with methyl methacrylate. Among these are the (meth)-acrylates described above and also the monomers copolymerizable with these.

The polymerization is generally initiated by known free-radical initiators. Among the preferred initiators are, inter alia, the azo initiators well known to persons skilled in the art, e.g. AIBN and 1,1-azobis-cyclohexanecarbonitrile, and also peroxy compounds, such as methyl ethyl ketone peroxide, acetylacetone peroxide, dilauroyl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy) cyclohexane, 1,1-bis(tert-butyl-peroxy)-3,3,5-trimethylcyclohexane, cumyl hydroperoxide, tert-butyl hydroperoxide, bis(4-tert-butylcyclohexyl)peroxydicarbonate, mixtures of two or more of the abovementioned compounds with one another, and also mixtures of the abovementioned compounds with compounds not mentioned which can likewise form free radicals.

The amount often used of these compounds is from 0.1 to 10% by weight, preferably from 0.5 to 3% by weight, based on the total weight of the monomers.

The median particle size of the polyalkyl(meth)-acrylate bead polymers to be used for the purposes of the present invention is in the range from 30 to 70 μm, preferably from 35 to 60 μm.

These particle sizes can be obtained via bead polymerization in a known manner.

Laser extinction methods can be used to determine the particle size, and also the particle size distribution. Use may be made here of a Galay-CIS from L.O.T. GmbH, and the test method for determination of particle size and also of particle size distribution is found in the user handbook. The $V_{50}$ median particle size derives from the ponderal median, where the value for 50% by weight of the particles is smaller than or equal to this value and for 50% by weight of these particles is greater than or equal to this value.

The polyalkyl(meth)acrylate bead polymers are preferably spherical. For the purposes of the present invention, the term spherical means that the particles preferably have a spherical shape, but it is obvious to the person skilled in the art that particles where the shape is different may be present as a consequence of the methods of preparation, or that the shape of the particles can deviate from the ideal spherical shape.

Accordingly, the term spherical means that the ratio of the greatest dimension of the particles to the smallest dimension is at most 4, preferably at most 2, each of these dimensions being measured through the centre of gravity of the particles. It is preferable that at least 70%, but particularly preferably at least 90%, based on the number of the particles, is spherical.

According to one particular aspect of the present invention, these particles have uniform distribution in the plastics matrix, with no significant aggregation or accumulation of the particles. Uniformly distributed means that the concentration of particles within the plastics matrix is substantially constant.

The dispersion polymerization process is usually carried out in water.

The water:monomer ratio is usually in the range from 0.4:1 to 20:1, preferably 2:1 to 8:1, based on the weight of the components.

To stabilize the dispersion, it is necessary to use stabilizers which are sparingly soluble in water. Use may be made here in particular of inorganic compounds or of organic compounds. Aluminum compounds are preferably used. Among these are in particular aluminum oxide $Al_2O_3$ and aluminum hydroxide $Al(OH)_3$, $Al(OH)_3$ being preferred. Aluminum hydroxide which is prepared via precipitation is of particular interest, and this precipitation should take place fairly shortly prior to formation of the dispersion. In particular embodiments of the process, the precipitation takes place within a period of 2 hours, preferably within a period of 1 hour, and very particularly preferably within a period of 30 minutes, prior to formation of the dispersion.

By way of example, $Al_2(SO_4)_3$ can be dissolved in water. This solution can then be treated with a sodium carbonate solution until the pH is in the range from 5 to 5.5. This procedure gives a colloidal dispersion of the aluminum compound in water, which is particularly preferred.

The amount used of the stabilizers, in particular the aluminum compounds, is preferably from 0.5 to 200% by weight, particularly preferably from 1 to 100% by weight, and very particularly preferably from 2 to 20% by weight, based on the total weight of the monomers used. If smaller amounts are used there is a risk that all that is obtained is an unstable dispersion, and that phase separation occurs, or at least formation of relatively large aggregates. If larger amounts are used, there is a risk that it is impossible to achieve a uniform dispersion.

Processes which use other auxiliaries for stabilization are also of particular interest. Among these are in particular surface-active substances, such as anionic, cationic and neutral emulsifiers.

Examples of anionic emulsifiers are alkali metal salts of higher fatty acids having from 8 to 30 carbon atoms, such as palmitic, stearic and oleic acid, alkali metal salts of sulfonic acids having, by way of example, from 8 to 30 carbon atoms, in particular sodium salts of alkyl- or arylalkylsulfonic acids, alkali metal salts of half esters of phthalic acid, and alkali metal salts of resin acids, such as abietic acid.

Cationic emulsifiers are, inter alia, salts of long-chain, in particular unsaturated, amines having from 10 to 20 carbon atoms, or quaternary ammonium compounds having relatively long-chain olefin or paraffin radicals.

Examples of neutral emulsifiers are ethoxylated fatty alcohols, ethoxylated fatty acids and ethoxylated phenols and fatty acid esters of polyhydric alcohols, such as pentaerythritol or sorbitol.

The amounts used of the abovementioned emulsifiers are preferably from 0 to 5% by weight, particularly preferably from 0.3 to 3% by weight, based on the weight of the aluminum compound.

The usual additives and auxiliaries may moreover be added to the mixture prior to, during, or after formation of the dispersion. Among these are in particular substances which give the particles particular properties, e.g. polymers, dyes and pigments, which if appropriate have ferromagnetic properties. It is also possible to use complexing agents, such as EDTA or Trilon A, and compounds which inhibit formation of deposits in the reactor, e.g. polyethylene glycol.

The particle size generally depends on the stabilizer system used. The particle size can moreover be altered by way of the shear rate. The precise shear rate values can readily be optimized by the person skilled in the art, and are dependent on the stabilizer system used.

The polymerization can be carried out at atmospheric pressure, subatmospheric pressure, or superatmospheric pressure. The polymerization temperature is also non-critical. However, depending on the initiator system used, it is generally in the range from 0° to 200° C., preferably from 40° to 130° C. and particularly preferably from 60° to 120° C., with no intended resultant restriction.

Once the polymerization has ended, the aluminum compound can be converted into a water-soluble form, for example via addition of sulfuric or hydrochloric acid. The bead polymer can easily be isolated from the water via filtration under pressure. If known organic compounds are used instead of the aluminum compound to stabilize the dispersion, the rheological properties of the mixture prevent this type of filtration.

For the purposes of the present invention, the bead polymers obtained according to the process described above are incorporated into polyalkyl(meth)acrylate-containing molding compositions. Molding compositions are formulations which are capable of thermoplastic processing.

Particularly preferred molding compositions comprise, based on the total weight of the molding composition, at least 60% by weight of matrix polymers which are obtainable via polymerization of a monomer mixture which comprises at least 10% by weight, preferably at least 20% by weight, of (meth)acrylates, in particular methyl methacrylate. In particular embodiments, the proportion of these preferred matrix polymers is at least 80% by weight. With respect to the (meth)acrylates, reference may be made to the definition set out above. It is particularly preferable here to use methyl methacrylate.

Among these materials are in particular poly(meth)-acrylates having a high proportion of units which derive from methyl methacrylate, the proportion preferably being at least 60% by weight, particularly preferably at least 80% by weight.

Particularly preferred molding compositions of this type are commercially available with the trade mark Acrylite® from Cyro Inc. USA.

The weight-average molar mass $\overline{M}_w$ of the homo- and/or copolymers to be used according to the invention as matrix polymers can vary widely, and the molar mass here is usually matched to the intended use of the molding composition and its mode of processing. However, it is generally from 20,000 to 1,000,000 g/mol, preferably from 50,000 to 500,000 g/mol and particularly preferably from 80,000 to 350,000 g/mol, with no intended resultant restriction.

According to one particular aspect of the present invention, the molding composition may, if appropriate, be given increased mechanical stability via an impact modifier. These impact modifiers for polymethacrylate plastics are well known, and by way of example the preparation and the structure of impact-modified polymethacrylate molding compositions are described, inter alia, in EP-A 0 113 924, EP-A 0 522 351, EP-A 0 465 049 and EP-A 0 683 028.

According to one particular aspect of the present invention, polymethyl methacrylates used for preparation of impact-modified molding compositions may be those obtained via free-radical polymerization of mixtures which comprise from 80 to 100% by weight, preferably from 90 to 98% by weight, of methyl meth-acrylate and, if appropriate, from 0 to 20% by weight, preferably from 2 to 10% by weight, of other comonomers capable of free-radical polymerization and likewise listed above. Particularly preferred comonomers are, inter alia, $C_1$-$C_4$-alkyl(meth)acrylates, in particular methyl acrylate, ethyl acrylate or butyl methacrylate.

Impact-resistant polyalkyl(meth)acrylate molding compositions preferably encompass polymethyl meth-acrylates whose average molar mass $M_w$ is in the range from 20,000 to 350,000 g/mol, preferably from 90,000 g/mol to 200,000 g/mol, in particular from 100,000 g/mol to 150,000 g/mol.

Preferred impact-resistant molding compositions which may serve for preparation of the matrix comprise, based on the total weight of the impact-resistant molding composition comprising bead polymer, from 0.5 to 99, preferably from 50 to 95, particularly preferably from 60 to 90, of an impact modifier.

The ratio by weight of polymethyl methacrylate to the impact modifier depends, inter alia, on the processability of the impact modifier. If the impact modifier is capable of thermoplastic processing, it is not necessary to use polymethyl methacrylate. If impact modifiers are used which are not capable of thermoplastic processing it is preferable to add an amount of polymethyl methacrylate which permits thermoplastic processing of the compounded material. The ratio by weight of polymethyl methacrylates to impact modifier is preferably in the range from 0:1 to 3:2, particularly preferably from 0.1:1 to 0.5:1.

The impact modifier may be obtained in a known manner via bead polymerization or via emulsion polymerization.

Preferred impact modifiers are crosslinked particles whose median particle size is in the range from 50 to 1000 nm, preferably from 60 to 500 nm and particularly preferably from 80 to 300 nm.

Particles of this type can, by way of example, be obtained via the free-radical polymerization of mixtures which generally comprise at least 40% by weight, preferably from 50 to 70% by weight, of methyl methacrylate, from 20 to 80% by weight, preferably from 25 to 50% by weight, of butyl acrylate, and also from 0.1 to 2% by weight, preferably from 0.2 to 1% by weight, of a crosslinking monomer, e.g. of a polyfunctional(meth)acrylate, e.g. allyl methacrylate, and of comonomers which can be copolymerized with the abovementioned vinyl compounds.

Among the preferred comonomers are, inter alia, $C_1$-$C_4$-alkyl(meth)acrylates, such as ethyl acrylate or butyl acrylate, preferably methyl acrylate, or other monomers capable of vinylic polymerization, e.g. styrene. The mixtures for preparation of the abovementioned particles may preferably encompass from 0 to 10% by weight, preferably from 0.5 to 5% by weight, of comonomers.

Particularly preferred impact modifiers are polymer particles which have a core-shell structure having two layers, particularly preferably three layers. EP-A 0 113 924, EP-A 0 522 351, EP-A 0 465 049 and EP-A 0 683 028 describe, inter alia, core-shell polymers of this type.

Particularly preferred impact modifiers based on acrylate rubber have, inter alia, the following structure:
Core: polymer with at least 90% by weight methyl methacrylate content, based on the weight of the core.
Shell 1: polymer with at least 70% by weight butyl acrylate content, based on the weight of the first shell.
Shell 2: polymer with at least 90% by weight methyl methacrylate content, based on the weight of the second shell.

Alongside the monomers mentioned, other monomers may be present in the core, and also in the shells. These monomers have been described above, and particularly preferred comonomers have crosslinking action.

By way of example, a preferred acrylate rubber modifier may have the following structure:
Core: copolymer composed of methyl methacrylate (95.7% by weight), ethyl acrylate (4% by weight) and allyl methacrylate (0.3% by weight)
S1: copolymer composed of butyl acrylate (81.2% by weight), styrene (17.5% by weight) and allyl methacrylate (1.3% by weight)
S2: copolymer composed of methyl methacrylate (96% by weight) and ethyl acrylate (4% by weight).

The core:shell(s) ratio of the acrylate rubber modifiers may vary within a wide range. The core:shell ratio C/S is preferably in the range from 20:80 to 80:20, with preference from 30:70 to 70:30 in the case of modifiers with one shell, or in the case of modifiers with two shells the core:shell 1:shell 2 ratio C/S1/S2 is preferably in the range from 10:80:10 to 40:20:40, particularly preferably from 20:60:20 to 30:40:30.

The particle size of the core-shell modifier is usually in the range from 50 to 1000 nm, preferably from 100 to 500 nm and particularly preferably from 150 to 450 nm, without any intended resultant restriction.

Impact modifiers of this type are commercially obtainable from Mitsubishi with the trade mark METABLEN® IR 441. It is also possible to obtain impact-modified molding compositions.

According to one particular aspect, the molding compositions encompass acrylate-based impact modifiers which are capable of thermoplastic processing.

These acrylate-based impact modifiers capable of thermoplastic processing preferably have a Vicat B softening point in the range from 60 to 90° C.

The modulus of elasticity of the acrylate-based impact modifiers capable of thermoplastic processing is preferably in the range from 700 to 1500 MPa, particularly preferably in the range from 800 to 1200 MPa, to ISO 527-2. The Charpy notched impact resistance of preferred impact-resistant polyalkyl(meth)acrylates to ISO 179: 1993 (179/1 eU) is preferably greater than or equal to 70 kJ/m$^2$, the notched impact strength particularly preferably being greater than 80 kJ/m$^2$.

Preferred acrylate-based impact modifiers capable of thermoplastic processing are obtainable via bulk polymerization or bead polymerization in an aqueous medium.

Preferred acrylate-based impact modifiers capable of thermoplastic processing are known per se, and these copolymers are obtainable via processes described, inter alia, in DE-A 1 645 232 and DE-A 33 29 765.

A first stage here preferably polymerizes a hard phase A) with a glass transition temperature Tg>25° C. composed of from 70 to 100% by weight of methyl meth-acrylate (MMA) and from 0 to 30 by weight of an acrylate of a $C_1$-$C_8$ alcohol or of a methacrylate of a $C_2$-$C_8$ alcohol and from 0 to 10% by weight of one or more other vinyl monomers copolymerizable with the esters mentioned.

A second stage adds the monomers of the tough phase B) and polymerizes these. The glass transition temperature Tg of the polymers of the tough phase B), regarded independently of the existence of the hard phase, is <25° C., preferably <10° C.

The polymerization of the hard phase A) in the first stage preferably takes place in the presence a) of an oil-soluble free-radical initiator and b) of an organic sulfur regulator having at least two thiol groups in the molecule.

According to one preferred aspect, the polymerization of the tough phase B) is carried out in the presence of the hard phase A), by permitting the monomers to penetrate into the previously formed hard phase A) with swelling, and thus carrying out the polymerization of the monomers of the tough phase substantially within the previously formed hard phase. It is particularly advantageous here to carry out the polymerization with the aid of the residual initiator still present in the hard phase.

The glass transition temperature (Tg) may, by way of example, be found in the literature reference Brandrup and E. H. Immergut, "Polymer Handbook", Interscience 1966, p III-61 to III-63, or "Kunstoff-Handbuch" [Plastics Handbook], Volume IX, Editor R. Vieweg and F. Esser, Carl-Hanser-Verlag, Munich 1975, pp. 333-339 and T. G. Fox in Bull. Am. Physics Soc., Vol. I, (3) p. 123 (1956). The glass transition temperature of the hard phase A) and that of the tough phase B) may moreover be determined via DSC.

The glass transition temperature Tg of the hard phase polymerized in stage A), regarded independently of the tough phase, is generally above 25° C., preferably 60° C. or above.

These values are achieved via use of from 70 to 100% by weight of methyl methacrylate, and from 0 to 30% by weight of an acrylate of a $C_1$-$C_8$ alcohol or of a meth-acrylate of a $C_2$-$C_8$ alcohol may be copolymerized here.

Examples which may be mentioned of alkyl acrylates are methyl acrylate, ethyl acrylate, propyl acrylate, isopropyl acrylate, butyl acrylate, in particular n-butyl and isobutyl acrylate, n-hexyl acrylate and 2-ethyl-hexyl acrylate, and also neopentyl acrylate.

Examples which may be mentioned of alkyl methacrylates using $C_2$-$C_8$ alcohols are ethyl methacrylate, n-propyl methacrylate, butyl methacrylate, in particular n-butyl methacrylate.

The esters mentioned may also be used in the form of mixtures.

Examples of other vinyl monomers which are copolymerizable in proportions of from 0 to 10% by weight with the esters mentioned have been set out in some detail above. Preference is given to the use of aromatic vinyl compounds, e.g. styrene and its derivatives, such as α-methylstyrene, p-methylstyrene, and also vinyl esters of aromatic or aliphatic carboxylic acids, e.g. vinyl acetate, vinyl benzoate, and also acrylonitrile and methacrylonitrile.

The monomers of the tough phase B) are defined by the glass transition temperature Tg of their homo- or copolymers (independently of the hard phase), which is <25° C., preferably <10° C. Methacrylates which may be used are the above-mentioned esters of $C_2$-$C_8$ alcohols, and acrylates which may be used are those of $C_1$-$C_8$ alcohols, also in the form of mixtures.

The sulfur regulators preferably used having at least two thiol groups in the molecule generally contain at least 2, preferably at least 6, carbon atoms in the molecule, but generally not more than 40. By way of example, it is advantageous for one, or preferably two or more, α-mercaptocarboxylic esters to be present in the molecule, preferably derived from, by way of example, polyols, e.g. from glycol, from propanediol, from glycerol, from pentaerythritol, etc., and mention may particularly be made of pentaerythritol tetrathioglycolate. The sulfur regulators having at least two thiol groups in the molecule may be represented to some extent via the formula (I)

$$HS—CH_2-A-CH_2—SH \qquad (I)$$

where A is a hydrocarbon chain having from 3 to 16 carbon atoms, in particular a hydrocarbon chain having from 4 to 8 carbon atoms or a

radical, in which n is 0 or a number from 1 to 8, in particular 0 and from 1 to 5, and Y is a hydrocarbon chain having from 2 to 16 carbon atoms and, if appropriate having substitution by

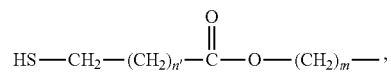

in which the definition of n' is the same as that of n, and m is 0 or a number from 1 to 8.

If an organic sulfur regulator is used, its content during the polymerization of the hard phase in stage A) is generally from 0.05 to 5% by weight, preferably from 0.1 to 2% by weight, based on the hard phase A).

Examples of oil-soluble (water-insoluble) free-radical initiators a) which may be used are peroxidic and azo compounds of this type (U.S. Pat. No. 2,471,959). By way of example, mention may be made of organic peroxides, such as dibenzoyl peroxide, lauroyl peroxide, or peresters, such as tert-butyl 2-ethylperhexanoate, and also azo compounds, such as azo isobutyronitrile, and other known initiators of this type. Additional use may be made of free-radical generators with relatively high decomposition temperatures if, by way of example, the temperature is raised towards the end of the reaction in order to maximize completion of the polymerization process.

The proportion of the oil-soluble free-radical initiators is generally from 0.01 to 5% by weight, preferably from 0.2 to 3% by weight, particularly preferably from 0.5 to 2.5% by weight, based on the monomers of stage A).

Among the graft-linking agents preferably used in stage B) mention may be made either of monomers having at least two polymerizable units but having different reactivity within the molecule, or monomers having at least three similar polymerizable units in the molecule (where the different reactivity of the polymerizable units which are per se similar is probably attributable in the latter case to the steric hindrance which arises during the course of the polymerization process in respect of the remaining polymerizable units).

Both types of graft-linking agent (i.e. monomers having at least two polymerizable units but having different reactivity within the molecule and monomers having at least three similar polymerizable units within the molecule) improve the clarity of the impact-resistant molding compositions. These types of graft-linking agent give better capability for thermoplastic processing (e.g. extrudability) of the material when compared with other crosslinking agents, e.g. butanediol dimethacrylate.

The graft-linking agents preferably used and described above, having at least two polymerizable units but having different reactivity can be described via the general formula II

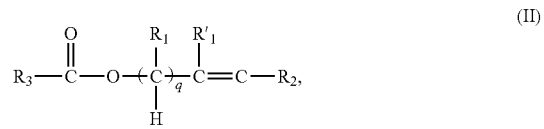

in which $R_1$ and $R_2$ are hydrogen and methyl, and $R_3$ is a

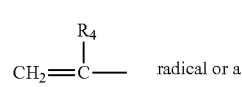 radical or a

-continued

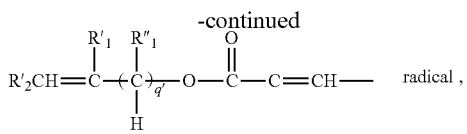
radical, in which R<sub>4</sub> is hydrogen or methyl, and q and q' are 0 or 1, and the definitions of R'<sub>1</sub>, R''<sub>1</sub> and R'<sub>2</sub> are the same as those of R<sub>1</sub> and, respectively, R<sub>2</sub>.

By way of example, mention may be made of the allyl, methallyl, and crotyl esters of α,β-unsaturated carboxylic acids, e.g. allyl methacrylate and allyl acrylate, and also the corresponding methallyl, crotyl and vinyl esters. Trimethylolpropane triacrylate may be mentioned as an example of graft-linking agents having three similar polymerizable units within the molecule.

The moldings compositions may comprise other polymers alongside the polyalkyl(meth)acrylates. Among these are polyacrylonitriles, polystyrenes, polyethers, polyesters, polycarbonates, polyvinyl chlorides. Polyalkyl(meth)acrylates are among these. These polymers may be used individually or else in the form of a mixture. These polymers may moreover also be present in the form of copolymers.

If the intention is to give the molding compositions diffusing properties, the refractive index $n_D$ at 20° C. of the bead polymers differs from that of the matrix polymer. This difference between the refractive index of the matrix polymers and the refractive index of the bead polymers is measured at the Na D line (589 nm) and at 20° C. Preferred diffuse embodiments of the inventive molding compositions have a refractive index difference of at least 0.01. The greater the difference, the smaller the possible proportion selected of the bead polymers in the molding composition to give identical scattering properties.

A difference between the two refractive indices is essential if the material is to have diffusing properties. Accordingly, the refractive index of the matrix polymers may be greater than or smaller than the refractive index of the bead polymers. Known methods can be used to adjust the refractive index. By way of example, monomers which contain sulfur atoms may be copolymerized during the preparation of the matrix polymers or of the bead polymers.

If optical clarity is desired, the refractive index of the molding composition may be matched to the refractive index of the bead polymers, and matching of the bead polymers is another possibility here. This can likewise be achieved via selection of the comonomers.

The proportion of the bead polymers in the molding composition depends on the desired degree of stress cracking resistance, and also on the surface roughness to be achieved.

The molding compositions may generally comprise, based on the total weight of the molding composition, from 0.1% by weight to 50% by weight, preferably from 1% by weight to 40% by weight, and particularly preferably from 10% by weight to 25% by weight, of bead polymers, with no intended resultant restriction.

Particularly preferred molding compositions which may be used encompass
a) at least 50% by weight, preferably at least 70 parts by weight, of impact modifier which encompasses at least one polyalkyl meth(acrylate) phase,
b) at least 5 parts by weight, preferably at least 8% by weight, of polyalkyl(meth)acrylate bead polymers whose median particle size $V_{50}$ is in the range from 30 to 70 μm and
c) from 0 to 42% by weight, preferably from 5 to 20% by weight, of polyalkyl(meth)acrylates, preferably polymethyl methacrylates, whose molar mass is in the range from 20,000 to 350,000 g/mol, where the % by weight figures for components a) to c) give 100% by weight.

According to another aspect of the present invention, molding compositions which may be used with particular preference encompass
a) at least 50% by weight, preferably at least 70% by weight, of impact modifier which encompasses at least one polyalkyl meth(acrylate) phase,
b) at least 5% by weight, preferably at least 8% by weight, of polyalkyl(meth)acrylate bead polymers whose median particle size $V_{50}$ is in the range from 30 to 70 μm and
c) from 0 to 42% by weight, preferably from 5 to 20% by weight, of polyalkyl(meth)acrylates, preferably polymethyl methacrylates, whose molar mass is in the range from 20,000 to 350,000 g/mol and
d) from 0 to 40% by weight, preferably from 0.1 to 20% by weight, of additives, based in each case on the total weight of the molding composition.

The impact modifier has been described above, and it is possible here to use either core/shell or core/shell/—shell impact modifiers which are not capable of thermoplastic processing, or else acrylate-based impact modifiers capable of thermoplastic processing. It is particularly preferable to use acrylate-based impact modifiers capable of thermoplastic processing, these being in particular obtainable via the bead polymerization process described above.

The molding compositions may comprise conventional additives of any type. Among these are, inter alia, antistatic agents, antioxidants, mould-release agents, flame retardants, lubricants, dyes, flow improvers, fillers, light stabilizers and organic phosphorus compounds, such as phosphates or phosphonates, pigments, weathering stabilizers and plasticizers.

The molding compositions can give moldings with a matt surface which have excellent properties. Particularly preferred moldings encompass at least 80% by weight, particularly preferably at least 90% by weight, of the molding composition described above.

The molding compositions described above can be used in known processes, such as injection molding or extrusion, to give moldings which can be used in the furniture industry, for example.

The thickness of the molding depends on the application. For example, the inventive molding compositions can be extruded to give foils. The molding compositions can moreover be molded to give sheets with the usual dimensions. Particular embodiments of the inventive moldings have a thickness in the range from 0.05 mm to 50 mm, preferably from 0.1 to 25 mm.

The inventive moldings exhibit excellent mechanical and thermal properties. The moldings also have excellent stress cracking resistance.

According to one particular embodiment of the present invention, the average surface roughness $R_z$ of the moldings can be from 5μ to 70μ, in particular from 5 to 50μ.

The average surface roughness $R_z$ can be determined to DIN 4768 using Taylor Hobson Talysurf 50 test equipment, $R_z$ being the average roughness depth calculated from the averages of the individual roughness depths from five successive individual measurement traverses within the roughness profile.

The modulus of elasticity of particular embodiments of the inventive moldings is preferably greater than or equal to 1000 MPa, particularly preferably greater than or equal to 1100 MPa, measured to ISO 527-2 (1 mm/min; 23° C.). The modulus of elasticity can be increased, inter alia, via an increase in the proportion of polyalkyl(meth)acrylate bead polymers or polyalkyl(meth)acrylates whose molar mass is in the range from 20,000 to 350,000 g/mol.

The Charpy notched impact resistance to ISO 179, 1993 (Charpy 179/1 eU, at 23° C.) of preferred moldings is preferably at least 4.5 kJ/m$^2$, particularly preferably at least 5.5 kJ/m$^2$. The notched impact strength can be increased, inter alia, via an increase in the proportion of impact modifier.

The Vicat softening point to ISO 306, August 1994 (16 h/80° C.; B50; mini-Vicat system) is preferably at least 75° C., particularly preferably at least 85° C.

The invention is illustrated in detail below via inventive examples, but there is no intention to restrict the invention thereto.

A) Test Methods

The thermal properties were determined according to Vicat using the mini-Vicat system, test standard ISO 306, August 1994 (16 h/80° C.; method B50).

Modulus of elasticity was determined to ISO 527-2 ((1 mm/min; 23° C.).

Yield strain, yield stress and nominal tensile strain at break were determined to ISO 527 at 23° C.

Surface roughness was measured on moldings of thickness 3 mm. Roughness variables Ra, Rz and Rmax were determined to DIN 4768, using the following cut-off values: Ra values <2 µm are determined using a cut-off of 0.8 mm, and if Ra is greater than 2 µm, values are determined using a cut-off of 2.5 mm. Talysurf 50 test equipment was used for the roughness measurements (manufacturer: Rank Taylor Hobson GmbH).

Stress cracking resistance was determined via complete immersion of the molding for 5 minutes in an ethanol/-water mixture (ratio by volume: 90/10) at 23° C., and assessing the resultant cracks visually. Moldings of thickness 3 mm, width 3.5 cm and length 55 cm were extruded for this purpose. The moldings were flexed and placed in a container (diameter 18.7 cm, height 10 cm) to which ethanol/water mixture had been charged. Stress cracking resistance was assessed according to the following system:

| | |
|---|---|
| − | If many fractures occurred |
| o | If up to 2 fractures occurred |
| + | If no fractures occurred |

B) Preparation of the Plastics Article A

For preparation of spherical plastics particles, an aluminum hydroxide Pickering stabilizer was used, and was prepared via precipitation from aluminum sulfate and soda solution (1N sodium carbonate solution) immediately prior to start of the actual polymerization process. For this, 38 L of deionized water, 400 g of aluminum sulfate and 8 g of complexing agent (Trilon A) were first used to form an initial charge, with stirring (330 rpm) by an impeller stirrer, in a N$_2$-flushed 100 L V4A tank with baffle, Ni—Cr—Ni thermocouple and heating circuit. 1760 g of soda solution were then added to precipitate the aluminum hydroxide, and the dispersing agent K30 emulsifier (4 g) obtainable from Bayer AG (sodium salt of a C15 paraffin sulfonate) and Polywachs 5000/6000 (4 g) obtainable from Hoechst (polyethylene glycol whose molecular weight is in the range from 5000 to 6000) were also added, in each case dissolved in 240 ml of deionized water. The pH was about 5.3 after the precipitation process, giving a colloidal dispersion of the stabilizer in the water.

A monomer mixture composed of 6900 g of methyl methacrylate, 3000 g of styrene, 100 g of glycol dimethacrylate, 200 g of dilauroyl peroxide, 20 g of tert-butyl 2-ethylperhexanoate and 50 g of 2-ethylhexyl thioglycolate was then added, likewise at room temperature.

This was followed by the phase of heating to a temperature of 80° C., and when the internal temperature of the tank was 40° C. the reactor was sealed and the N$_2$ feed was stopped. Within the next 115 minutes, the internal temperature rises to about 87° C. and the pressure increases from 0.70 to 0.92 bar. After the temperature maximum, the reaction mixture was heated to about 87-88° C., and stirring was continued at this temperature for about 1 hour, the stirrer speed being reduced to 200 rpm. Once the reaction mixture had been cooled, the tank was depressurized at a temperature of 46° C. and then 400 ml of 50% strength sulfuric acid were added, thus converting the aluminum hydroxide into soluble aluminum sulfate and thus precipitating the suspension polymer. For workup of the beads, the resultant suspension was washed by way of a stoneware suction funnel with textile filter until neutral and dried at 50° C. for about 20 hours in a drying cabinet.

Size distribution was studied via laser extinction methods. The median size V$_{50}$ of the particles was 40.5 µm. The shape of the beads was spherical, and no fibres could be found. No coagulation occurred. The resultant particles are termed plastics particles A below.

C) Inventive Examples 1-6 and Comparative Examples 1

Various moldings were produced via extrusion. For this, various compounded materials were mixed in an extruder, with the formulations of the compounded materials being set out in Table 1. The compounded materials encompass the plastics particles A described above, impact modifier (prepared according to DE-A 3329765; encompassing 57.6% by weight of a hard phase composed of 98.3% by weight of methyl methacrylate and 1.7% by weight of methyl acrylate, and also 42.4% by weight of a tough phase composed of 42.4% by weight of butyl acrylate, 16% by weight of styrene, 5.8% by weight of methyl methacrylate and 1.4% by weight of allyl methacrylate, obtainable from Röhm GmbH und Co. KG), a PMMA molding composition obtainable from Röhm GmbH und Co. KG (copolymer composed of 96% by weight of methyl methacrylate and 4% by weight of methyl acrylate), and also palmitic acid (obtainable from Merck, Darmstadt). The percentages in Table 1 are based on the weight of the compounded materials.

A single-screw extruder (Ø×30) from Stork was used for the extrusion process, and the temperature of the melt here was generally 240° C. on discharge from the die.

The resultant moldings were studied according to the methods described above. The data obtained are set out in Table 1.

TABLE 1

| | Comparative Example 1 | Inventive Example 1 | Inventive Example 2 |
|---|---|---|---|
| Formulation | | | |
| Impact modifier | 75% | 81.5% | 83% |
| PMMA molding composition | 24.8% | 6.3% | 7.8% |
| Plastics particles A | | 12% | 9% |
| Palmitic acid | 0.2% | 0.2% | 0.2% |
| Vicat 16 h/80° C.; B50 [° C.] | 88 | 84.6 | |
| Stress cracking resistance | − | 0 | 0 |
| Mechanical properties | | | |
| NIR (Charpy) | 9.8 | 6.1 | 6.9 |

TABLE 1-continued

| | | | |
|---|---|---|---|
| (23/50° C.) [kJ/m$^2$] | | | |
| Tensile strength (50 mm/min; 23/50° C.) [MPa] | 37 | 30 | 30 |
| Modulus of elasticity (1 mm/min; 23/50° C.) [MPa] | 1510 | 1350 | 1345 |
| Yield strain [%] | 4.8 | 4.4 | 4.6 |
| Yield stress [MPa] | 37 | 30 | 30 |
| Tensile strain at break [%] | 42 | 25 | 28 |
| Surface roughness | | | |
| Average roughness R$_a$ [μm] | 0.1 | 5.8 | 4.1 |
| Average roughness depth R$_z$ [μm] | 0.3 | 37.5 | 29.2 |
| Max. roughness depth R$_{max}$ [μm] | 0.4 | 42.1 | 36.3 |

| | Inventive Example 3 | Inventive Example 4 | Inventive Example 5 | Inventive Example 6 |
|---|---|---|---|---|
| Formulation | | | | |
| Impact modifier | 90.8% | 75% | 84.8% | 75% |
| PMMA molding composition | 0% | 9.8% | 0% | 15.8% |
| Plastics particles A | 9% | 15% | 15% | 9% |
| Palmitic acid | 0.2% | 0.2°/a | 0.2% | 0.2% |
| Vicat 16 h/80° C.; B50 [° C.] | | 87.1 | | 85.6 |
| Stress cracking resistance | + | 0 | + | 0 |
| Mechanical properties | | | | |
| NIR (Charpy) (23/50° C.) [kJ/m$^2$] | 7.7 | 5.6 | 6.3 | 6.7 |
| Tensile strength (50 mm/min; 23/50° C.) [MPa] | 26 | 32 | 27 | 34 |
| Modulus of elasticity (1 mm/min; 23/50° C.) [MPa] | 1182 | 1482 | 1250 | 1487 |
| Yield strain [%] | 4.4 | 4.4 | 4.4 | 4.7 |
| Yield stress [MPa] | 26 | 32 | 27 | 34 |
| Tensile strain at break [%] | 34 | 20 | 27 | 23 |
| Surface roughness | | | | |
| Average roughness R$_a$ [μm] | 4.2 | 6.0 | 5.6 | 4.0 |
| Average roughness depth R$_z$ [μm] | 29.3 | 39.5 | 39.1 | 26.6 |
| Max. roughness depth R$_{max}$ [μm] | 37.6 | 49.4 | 45.5 | 13.8 |

Surprisingly, it has been found that the use of the matting agent can give moldings with high stress cracking resistance, with excellent notched impact resistance, and also with high modulus of elasticity and with high Vicat softening point. The improvement in stress cracking resistance via the use of polyalkyl(meth)acrylate bead polymers is also particularly apparent from comparison of Inventive Example 5 with Inventive Examples 1, 2 and 6.

The invention claimed is:

1. A molding composition, comprising:
    a) at least 70% by weight of an impact modifier which comprises at least one polyalkyl(meth)acrylate phase capable of thermoplastic processing,
    b) at least 8% by weight of a polyalkyl(meth)acrylate bead polymer whose median particle size V$_{50}$ is in the range from 30 to 70 μm, and
    c) from 0 to 42% by weight of a polyalkyl(meth)acrylate whose weight average molar mass is in the range from 20,000 to 350,000 g/mol, wherein a sum of the % by weight of components a) to c) is 100% by weight;
    wherein the impact modifier comprises a hard phase A) whose glass transition temperature Tg is >25° C. comprising at least 70% by weight of methyl methacrylate, and a tough phase B) obtained from monomers the polymers of which have a glass transition temperature Tg of <25° C.,
    wherein the impact modifier is prepared by an at least two-stage polymerization process,
    wherein, in a first stage, said hard phase A) whose glass transition temperature Tg is >25° C. comprising at least 70% by weight of methyl methacrylate is polymerized to yield a hard phase A), and
    then, in a second stage, said monomers of the tough phase B), polymers of which have said glass transition temperature Tg of <25° C., are added to the polymerized hard phase A) and polymerized with the polymerized hard phase A).

2. The molding composition as claimed in claim 1, wherein the impact modifier comprises a polyalkyl(meth)acrylate phase whose glass transition temperature Tg is greater than 25° C.

3. The molding composition as claimed in claim 1, wherein the polymerization of the hard phase A) in the first stage takes place in the presence a) of an oil-soluble free-radical initiator, and b) of an organic sulfur compound having at least two thiol groups in the molecule.

4. The molding composition as claimed in claim 1, wherein the polymerization of the monomers of the tough phase B) in the second stage takes place with use of a graft-linking agent in the presence of the hard phase first formed.

5. A molding, comprising:
    a molding composition comprising
    a) at least 70% by weight of an impact modifier which comprises at least one polyalkyl(meth)acrylate phase capable of thermoplastic processing,
    b) at least 8% by weight of a polyalkyl(meth)acrylate bead polymer whose median particle size V$_{50}$ is in the range from 30 to 70 μm, and
    c) from 0 to 42% by weight of a polyalkyl(meth)acrylate whose weight average molar mass is in the range from 20,000 to 350,000 g/mol, wherein a sum of the % by weight of components a) to c) is 100% by weight;
    wherein the impact modifier comprises a hard phase A) whose glass transition temperature Tg is >25° C. comprising at least 70% by weight of methyl methacrylate, and a tough phase B) obtained from monomers the polymers of which have a glass transition temperature Tg of <25° C.,
    wherein the impact modifier is prepared by an at least two-stage polymerization process,
    wherein, in a first stage, said hard phase A) whose glass transition temperature Tg is >25° C. comprising at least 70% by weight of methyl methacrylate is polymerized to yield a hard phase A), and
    then, in a second stage, said monomers of the tough phase B), polymers of which have said glass transition temperature Tg of <25° C., are added to the polymerized hard phase A) and polymerized with the polymerized hard phase A).

6. The molding as claimed in claim 5, wherein the molding comprises at least 80% by weight of said molding composition.

7. The molding as claimed in 5, which is produced via extrusion, said molding having a thickness of 3 mm, a width of 3.5 cm and a length of 55 cm, said molding having at most 4 fractures, after 5 minutes in a flexed condition at 23° C. in an ethanol/water mixture (ratio by volume: 90/10).

8. The molding as claimed in claim 5, wherein the molding has a modulus of elasticity greater than or equal to 1000 MPa according to ISO 527-2.

9. The molding as claimed in claim 5, wherein the molding has a Vicat softening point greater than or equal to 75° C.

10. The molding as claimed in claim 5, wherein the molding has an average surface roughness $R_z$ of the sheet in the range from 4 to 70 μm.

11. The molding composition as claimed in claim 1, wherein component c) is present.

12. The molding as claimed in claim 5, wherein component c) is present.

* * * * *